United States Patent [19]

Peer

[11] 4,361,530
[45] Nov. 30, 1982

[54] METHOD OF AND APPARATUS FOR SHAPING A STRAND DURING EXTRUSION

[75] Inventor: Günter Peer, Friedberg-Stätzling, Fed. Rep. of Germany

[73] Assignee: Anton Heggenstaller, Unterbernbach, Fed. Rep. of Germany

[21] Appl. No.: 260,928

[22] Filed: May 6, 1981

[30] Foreign Application Priority Data

May 2, 1980 [DE] Fed. Rep. of Germany ....... 3016926

[51] Int. Cl.³ .............................................. B29J 5/10
[52] U.S. Cl. .................................. 264/120; 264/109; 264/40.7; 264/176 R; 264/210.2; 425/132; 425/325; 425/327; 425/381; 425/461; 425/466
[58] Field of Search .................... 264/210.2, 109, 120, 264/176 R, 40.7; 425/325, 327, 328, 466, 461, 381, 132

[56] References Cited

U.S. PATENT DOCUMENTS

| | | | |
|---|---|---|---|
| 1,775,735 | 9/1930 | Reker | 425/381 |
| 2,168,889 | 8/1939 | Thomas | 264/40.7 |
| 3,092,878 | 6/1963 | Conger | 264/120 |
| 3,518,157 | 6/1970 | Terry et al. | 264/120 |
| 3,548,452 | 12/1970 | Caleb | 425/381 |
| 3,551,545 | 12/1970 | Overdiep | 264/176 R |
| 3,914,085 | 10/1975 | Kruelskie | 425/466 |
| 3,989,433 | 11/1976 | Furman | 425/466 |
| 4,025,262 | 5/1977 | Furman | 425/466 |
| 4,124,347 | 11/1978 | Miller | 425/466 |

FOREIGN PATENT DOCUMENTS

2535989 2/1977 Fed. Rep. of Germany .
2714256 10/1978 Fed. Rep. of Germany ...... 425/461

*Primary Examiner*—Jeffery R. Thurlow
*Attorney, Agent, or Firm*—Karl F. Ross

[57] ABSTRACT

An extruder has a nozzle from which it extrudes a strand formed of a mixture of wood chips and a synthetic-resin binder into a passage formed by a plurality of transversely and longitudinally movable walls. Opposite walls are urged transversely inwardly by respective hydraulic cylinders to compact and densify the strand as it cures, and other cylinders urge the walls upstream toward the nozzle with a force slightly smaller than the extrusion force. Thus as the extrusion force exceeds the opposite longitudinal biasing force the walls will move downstream with the strand, to return upstream between advance steps of the strand.

10 Claims, 2 Drawing Figures

METHOD OF AND APPARATUS FOR SHAPING A STRAND DURING EXTRUSION

FIELD OF THE INVENTION

The present invention relates to a method of and apparatus for shaping a stand as it is being extruded. More particularly this invention concerns a strand comprised of wood chips and similar plant byproducts and a synthetic-resin binder.

BACKGROUND OF THE INVENTION

It is standard practice, as for example known from German Pat. No. 2,535,989, for an extruder to emit a strand formed of a mixture of wood chips and similar cellulosic plant byproducts and a suitable normally synthetic-resin binder into a shaping passage constituted by a plurality of longitudinally extending and transversely movable walls. Normally these walls are heated and are urged transversely inwardly by appropriate biasing elements, such as hydraulic or pneumatic cylinders, to compact the strand to the desired density as it cures.

In such systems the transverse biasing pressure, which is of course identical to the transverse force the passage walls exert on the strand, is normally decreased when the extrusion pressure drops below a predetermined level. In this manner friction between the strand and the passage walls is reduced and the strand can move longitudinally in the passage. Since the strand is normally extruded pulse-wise, that is in discrete advance steps between which the strand is stationary, the pressure is also relieved pulse-wise. The problem with this operational method is that the density of the finished cured strand frequently varies too greatly; some portions of the strand are insufficiently compacted and others are too hard.

OBJECTS OF THE INVENTION

It is therefore an object of the present invention to provide an improved method of and apparatus for extruding a strand and shaping it after extrusion.

Another object is the provision of such a method and apparatus wherein friction between the passage and the extruded strand can be reduced without producing a strand of varying density.

SUMMARY OF THE INVENTION

These objects are attained according to the instant invention in an extrusion system of the above-described general type wherein the strand is extruded longitudinally from a nozzle into a passage defined by a plurality of longitudinally extending walls including at least two opposite walls that are both transversely and limitedly longitudinally movable. According to this invention standard first biasing means is provided for urging the opposite walls toward each other with a predetermined transverse biasing force, and second biasing means is provided for urging the opposite walls longitudinally upstream toward the nozzle with a longitudinal biasing force related to the extrusion force and at least periodically exceeded thereby. Thus when the extrusion force exceeds the longitudinal biasing force the walls will move downstream with the strand.

The system according to the instant invention therefore allows the transverse biasing force, which determines the compaction of the strand and, hence, its density, to be maintained constant for a finished product of uniform density. Excessive friction at the wall-strand interface, which can lead to shear and damage of the strand surface, is avoided by allowing the passage-defining walls to step downstream with the strand as it is extruded, and slide back upstream on the strand between extrusion pulses or steps. The result is obviously a much higher quality product.

According to another feature of this invention the pressure exerted in the upstream direction by the second biasing means is made dependent on the extrusion pressure. When the extrusion pressure exceeds a predetermined threshold level, which corresponds to a predetermined degree of compaction of the strand, the longitudinal biasing pressure is reduced sufficiently that the walls will be pushed downstream with the strand. When the extrusion pressure drops below this threshold level the pressure is again increased to slide the walls back upstream on the strand. Simultaneously the transverse biasing force can be decreased to lessen the friction between the walls and the strand. This is achieved by connecting the hydraulic cylinders responsible for the upstream and transverse biasing to the hydraulic ram responsible for the extrusion through an appropriate hydraulic controller.

In accordance with another feature of this invention the walls are shaped complementarily to the desired strand shape. Thus if a cylindrical strand is to be produced, the walls can be constituted as two or more part-cylindrical tube segments urged radially inwardly. For a polygonal-section strand flat walls are used. It is possible for all of the walls to be transversely and longitudinally displaceable, or only the two major ones. Normally the walls are supported via rollers on the respective transverse biasing cylinders so that they can move longitudinally relative to them.

SPECIFIC DESCRIPTION

Figure 1:
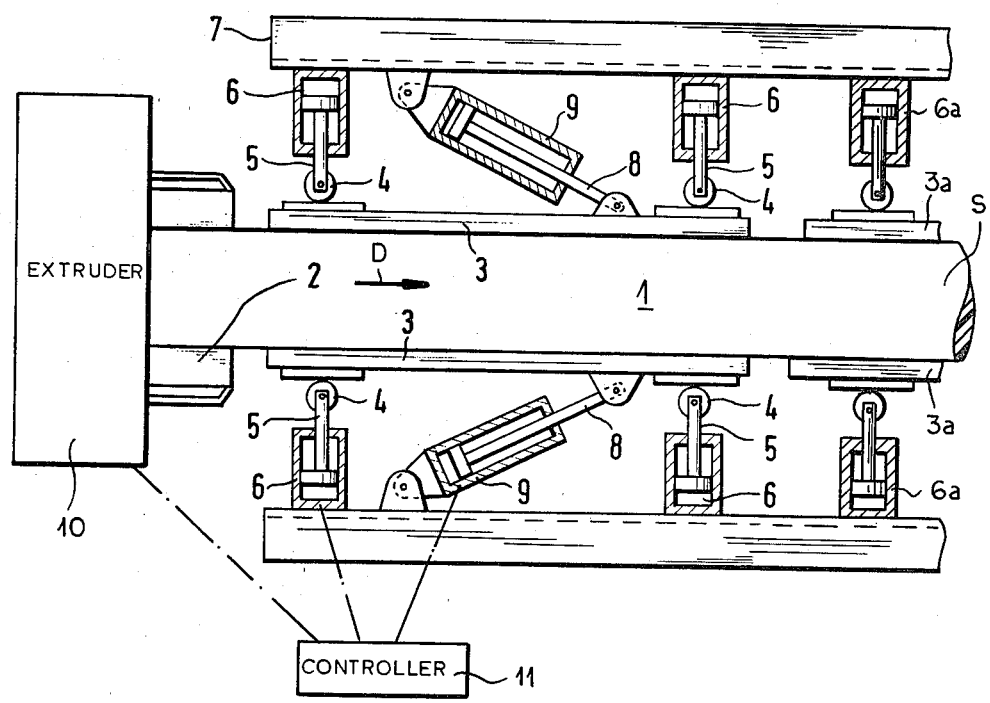
FIG. 1 is a horizontal and longitudinal section through an extrusion system according to the instant invention.
Figure 2:
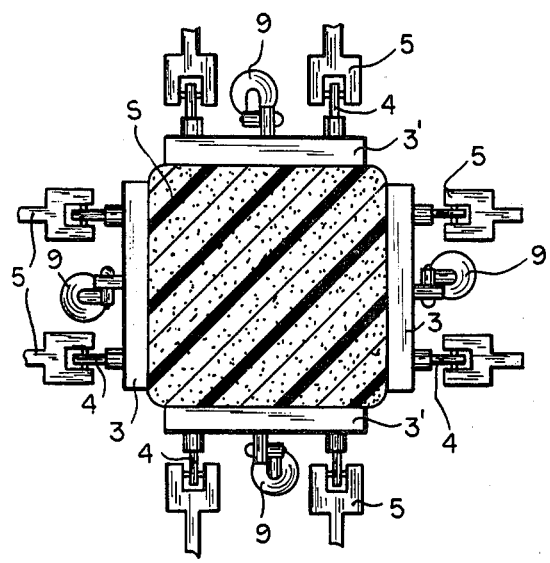
FIG. 2 is a cross-section through the system of FIG. 1.

As seen in the drawing a hydraulic extruder 10 has a nozzle 2 from which it extrudes a strand S formed of a mixture of wood chips and sawdust together with an appropriate synthetic-resin binder such as a phenolic resin in a direction D into a square-section passage 1 formed by four similar wall plates 3 and 3′. The strand S leaves the nozzle 2 in discrete pulses or steps.

The walls 3 and 3′ are each supported on four rollers or wheels 4 supported on transversely extending piston rods 5 of transverse hydraulic cylinders 6 which are normally pressurized by the controller 11 at a constant pressure to compact the strand S transversely. The cylinders 6 in turn are fixed on stationary support beams 7.

In addition each wall 3 and 3′ is connected by means of a respective hydraulic cylinder 9 to the respective beam 7, with these cylinders 9 extending generally in the direction D and being pivoted on the respective walls and on the beams 7. These cylinders 9 are also connected to the controller 11 for pressurization to urge the walls 3 and 3′ upstream, that is opposite the direction D, with a force which is slightly less than the maximum force the strand S is extruded with.

Downstream of the walls 3 and 3' is another identical set of walls 3a having respective cylinders 6a and so on. The overall length of the passage 1 is therefore sufficient to ensure complete curing of the strand S.

In use, therefore, the force directed transversely inwardly by the cylinders 6 serves to compact and densify the freshly extruded strand S. The force that the strand S is extruded with exceeds briefly during each extrusion step the force the cylinders 9 exert in the opposite direction on the walls 3 and 3' and the coefficient of friction is such between the strand S and the walls 3 and 3' that the strand S will push the walls downstream. Once the extrusion force abates, however, the cylinders 9 will push these walls back upstream, sliding them on the strand S to return them to the illustrated upstream position. This upstream sliding can be assisted by a momentary release of pressure in the transverse biasing cylinders 6.

Thus with the system according to the instant invention the degree of compaction of the strand will be virtually perfectly uniform. The density of the product will therefore be similarly uniform.

I claim:

1. In combination with an extruder having a nozzle from which a strand is extruded stepwise in a longitudinal direction with an extrusion force that varies periodically with the stepwise extrusion of said strand, a strand-shaping assembly comprising:
    a plurality of longitudinally extending walls defining a longitudinal passage aligned with said nozzle and receiving said strand with same transversely engaging said walls, said walls including a pair of transversely opposite and substantially parallel walls;
    means mounting said opposite walls for movement transversely of said direction and limitedly in said direction;
    first biasing means for urging said opposite walls toward each other with a predetermined transverse biasing force; and
    second biasing means for urging said opposite walls longitudinally toward said nozzle with a longitudinal biasing force varying generally synchronously with said extrusion force and exceeded thereby once during each extrusion step, whereby when said extrusion force exceeds said longitudinal biasing force said opposite walls move downstream with said strand and when said longitudinal biasing force exceeds said extrusion force said opposite walls move upstream along said strand.

2. The combination defined in claim 1 wherein the mounting means includes rollers engaging and supporting said opposite walls.

3. The combination defined in claim 1 wherein said biasing means each include fluid cylinders braced against said opposite walls.

4. The combination defined in claim 1 wherein said walls includes two such pairs of opposite walls, said combination including second such mounting means, second such first biasing means, and second such second biasing means for the second pair of opposite walls.

5. A method of operating an extruding apparatus having an extruder with a nozzle directed longitudinally into a longitudinal passage defined by a plurality of longitudinally extending walls including at least two opposite transversely and longitudinally displaceable walls, said method comprising the steps of:
    extruding a plastic strand longitudinally and stepwise into said passage from said nozzle with an extrusion force and pressure that vary periodically with the stepwise extrusion of said strand;
    urging said opposite walls transversely toward each other with a transverse biasing force; and
    urging said opposite walls longitudinally toward said nozzle with a longitudinal biasing force varying generally synchronously with said extrusion force and exceeded thereby once during each extrusion step, whereby when said extrusion force exceeds said longitudinal force said opposite walls move downstream with said strand and when said longitudinal biasing force exceeds said extrusion force said opposite walls move upstream along said strand.

6. The method defined in claim 5, further comprising the step of decreasing said transverse biasing force at the end of each extrusion step.

7. The method defined in claim 6 wherein said longitudinal biasing force is decreased when said extrusion force exceeds a predetermined threshold level and is increased when said extrusion force drops below said level.

8. A method of operating an extruding apparatus having an extruder with a nozzle directed longitudinally into a longitudinal passage defined by a plurality of longitudinally extending walls including at least two opposite transversely and longitudinally displaceable walls, said method comprising the steps of:
    extruding a plastic strand longitudinally and stepwise into said passage from said nozzle with an extrusion force that varies periodically with the stepwise extrusion of said strand;
    urging said opposite walls transversely toward each other with a transverse biasing force;
    urging said opposite walls longitudinally toward said nozzle with a longitudinal biasing force; and
    varying at last one of said biasing forces generally synchronously with said extrusion force so that for a portion of each extrusion step said opposite walls slip longitudinally on said strand and for another portion of each step said opposite walls move longitudinally with said strand.

9. The method defined in claim 8 wherein said longitudinal biasing force is varied.

10. The method defined in claim 8 wherein said transverse biasing force is varied.

* * * * *